United States Patent
Emura et al.

(10) Patent No.: US 12,323,077 B2
(45) Date of Patent: Jun. 3, 2025

(54) MOTOR DRIVE DEVICE

(71) Applicant: Mitsubishi Electric Corporation, Tokyo (JP)

(72) Inventors: Yasuaki Emura, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 18/258,944

(22) PCT Filed: Mar. 17, 2021

(86) PCT No.: PCT/JP2021/010857
§ 371 (c)(1),
(2) Date: Jun. 22, 2023

(87) PCT Pub. No.: WO2022/195772
PCT Pub. Date: Sep. 22, 2022

(65) Prior Publication Data
US 2024/0039441 A1 Feb. 1, 2024

(51) Int. Cl.
*H02P 21/14* (2016.01)
*H02P 21/18* (2016.01)
*H02P 27/08* (2006.01)

(52) U.S. Cl.
CPC ............ *H02P 21/141* (2013.01); *H02P 21/18* (2016.02); *H02P 27/08* (2013.01)

(58) Field of Classification Search
CPC ........ H02K 11/33; H02K 15/33; H02P 27/06; H02P 27/08; H02P 21/26; H02P 21/22;
(Continued)

(56) References Cited

U.S. PATENT DOCUMENTS 11,005,404 B2  5/2021  Toyodome et al.
11,031,895 B2  6/2021  Kutsuki et al.
(Continued)

FOREIGN PATENT DOCUMENTS

JP   2008-148490 A   6/2008
WO   2018/078837 A1  5/2018
(Continued)

OTHER PUBLICATIONS

International Search Report of the International Searching Authority mailed Jun. 1, 2021 in corresponding International Application No. PCT/JP2021/010857 (and English translation).

*Primary Examiner* — Antony M Paul
(74) *Attorney, Agent, or Firm* — Posz Law Group, PLC

(57) ABSTRACT

A motor drive device includes: an inverter unit that supplies alternating current to a motor including a plurality of stator windings; a connection switching unit that is disposed between the inverter unit and the motor and switches a connection state of the stator windings; a rotor flux estimation unit that calculates an estimated rotor flux that is an estimated value of a rotor flux of the motor on the basis of current information that is a result of detection of a current value of the alternating current; and a determination processing unit that determines the connection state on the basis of the estimated rotor flux. The motor drive device determines an anomaly of the connection state while the motor is in operation.

8 Claims, 3 Drawing Sheets

(58) Field of Classification Search
CPC ........ H02P 21/18; H02P 21/141; H02P 21/14;
H02P 21/06; H02P 21/10; H02P 23/14;
H02P 27/12; H02P 6/28; H02P 25/22;
H02P 31/00; H02P 2207/05; H02P 25/18;
H02H 7/0833; H02M 1/4233
See application file for complete search history.

(56) References Cited

U.S. PATENT DOCUMENTS

| | | |
|---|---|---|
| 11,581,839 B2 | 2/2023 | Hongyo et al. |
| 2021/0270511 A1* | 9/2021 | Kim ........................ H02P 27/08 |

FOREIGN PATENT DOCUMENTS

| | | |
|---|---|---|
| WO | 2019/008756 A1 | 1/2019 |
| WO | 2020/152807 A1 | 7/2020 |

* cited by examiner

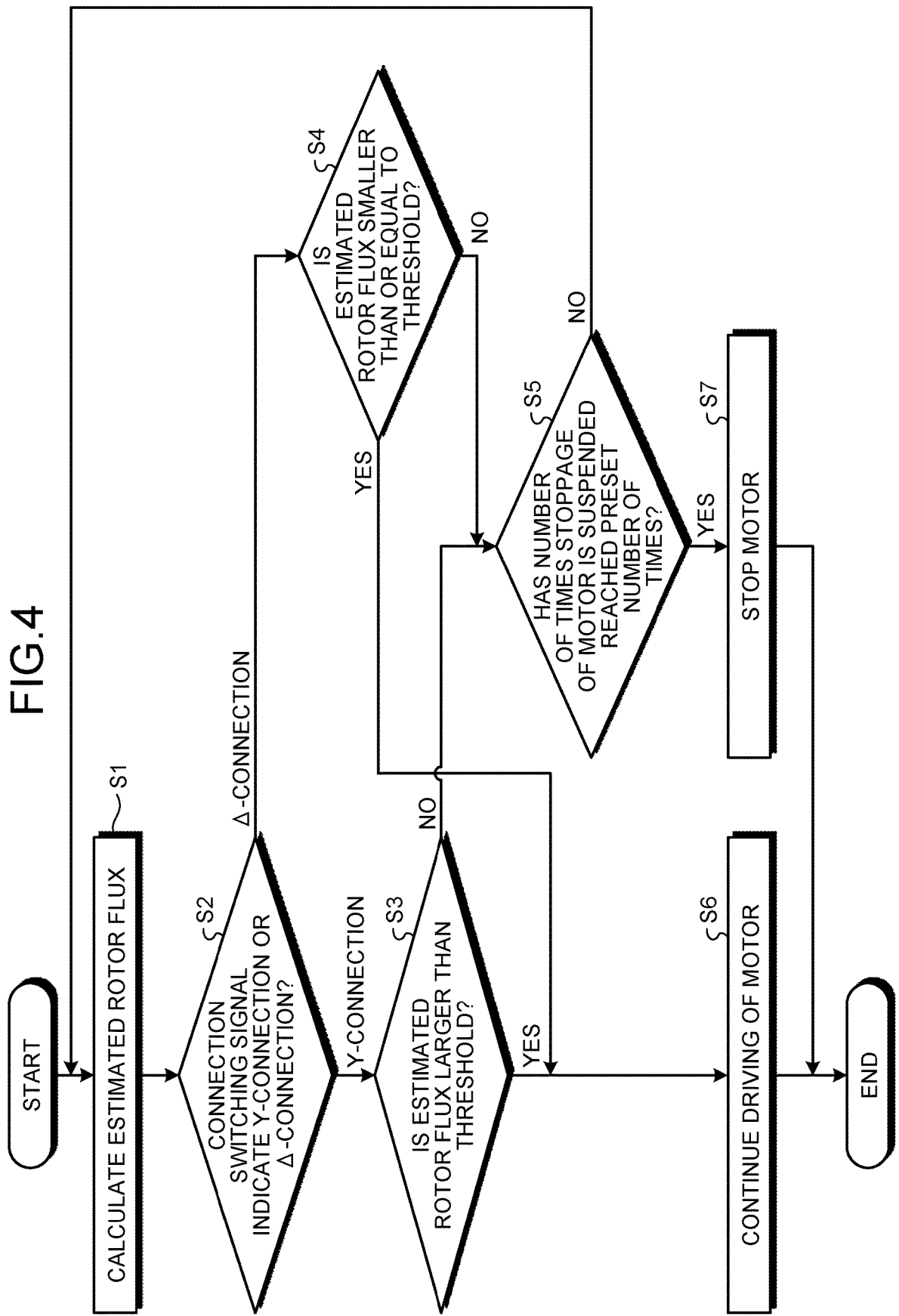

MOTOR DRIVE DEVICE

CROSS-REFERENCE TO RELATED APPLICATION

This application is a U.S. National Stage Application of International Application No. PCT/JP2021/010857 filed on Mar. 17, 2021, the contents of which are incorporated herein by reference.

TECHNICAL FIELD

The present disclosure relates to a motor drive device that drives a motor.

BACKGROUND

Known motors mounted to apparatuses such as air conditioners include a motor capable of switching the connection state of windings. A motor drive device switches the connection state in accordance with the operating conditions of the apparatus and operates the motor. When switching the connection state or when checking an anomaly in switching of the connection state, the motor drive device stops the motor and checks the connection state. Patent Literature 1 discloses a motor drive system that makes anomaly determination of the connection state by detecting an anomaly that is inconsistency between the actual connection state of the motor and the connection state recognized by the motor drive system.

PATENT LITERATURE

Patent Literature 1: PCT Patent Application Laid-open No. 2019/008756

With the conventional technique disclosed in Patent Literature 1, however, the motor drive device needs to stop the motor to check the connection state and thus cannot check the connection state while the motor is in operation.

SUMMARY

The present disclosure has been achieved in view of the above and an object thereof is to provide a motor drive device capable of checking the connection state while a motor is in operation.

In order to solve the above problems and achieve the object, a motor drive device according to the present disclosure includes: an inverter unit to supply alternating current to a motor including a plurality of stator windings; a connection switching unit to switch a connection state of the stator windings, the connection switching unit being disposed between the inverter unit and the motor; a rotor flux estimation unit to calculate an estimated rotor flux on a basis of current information, the estimated rotor flux being an estimated value of a rotor flux of the motor, the current information being a result of detection of a current value of the alternating current; and a determination processing unit to determine the connection state on a basis of the estimated rotor flux.

The motor drive device according to the present disclosure can achieve the effect of checking the connection state while a motor is in operation.

BRIEF DESCRIPTION OF DRAWINGS

FIG. 4 is a flowchart illustrating operation procedures performed by the motor drive device according to the first embodiment.

DETAILED DESCRIPTION

A motor drive device according to embodiments will be explained below in detail with reference to the drawings.

First Embodiment

Figure 1:
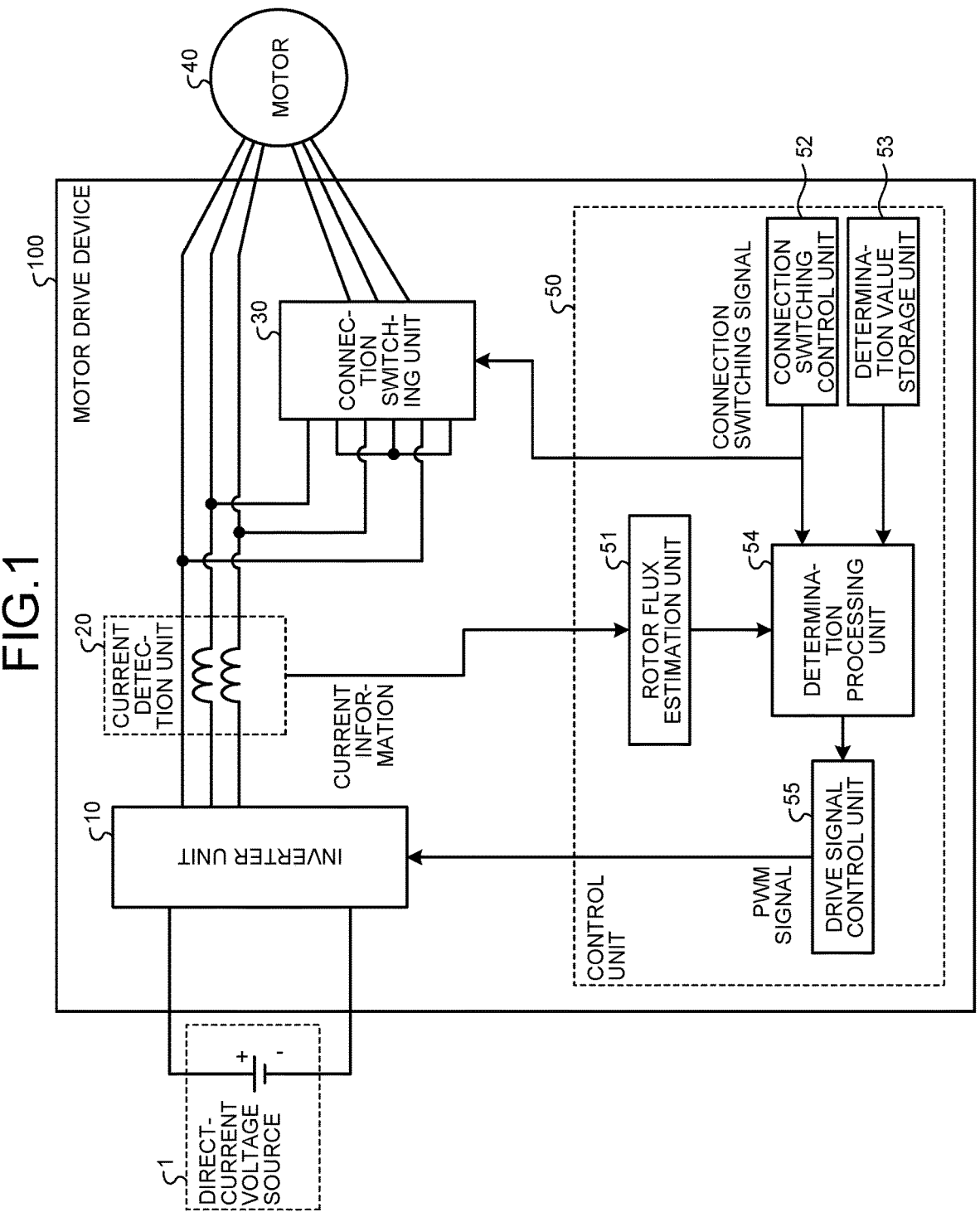
FIG. 1 is a diagram illustrating a configuration of a motor drive device according to a first embodiment.

FIG. 1 is a diagram illustrating a configuration of a motor drive device 100 according to a first embodiment. The motor drive device 100 drives a motor 40 that is a three-phase motor. The motor 40 includes a plurality of stator windings. The motor drive device 100 includes an inverter unit 10, a current detection unit 20, a connection switching unit 30, and a control unit 50.

The inverter unit 10 is connected to a direct-current voltage source 1. The inverter unit 10 converts a direct-current voltage from the direct-current voltage source 1 into an alternating-current voltage and supplies alternating current to the motor 40. The direct-current voltage source 1 only needs to be able to output a direct-current voltage and may be configured by connecting a converter to an alternating-current voltage source.

The current detection unit 20 detects the current value of the alternating current to be supplied to the motor 40 from the inverter unit 10. The connection switching unit 30 is disposed between the inverter unit 10 and the motor 40. The connection switching unit 30 switches the connection state of the stator windings of the motor 40. The control unit 50 performs signal processing for controlling the motor 40. Each of the components of the motor drive device 100 illustrated in FIG. 1 can be mounted on a single substrate. Each of the components of the motor drive device 100 may be mounted on a plurality of substrates in a distributed manner.

Figure 2:
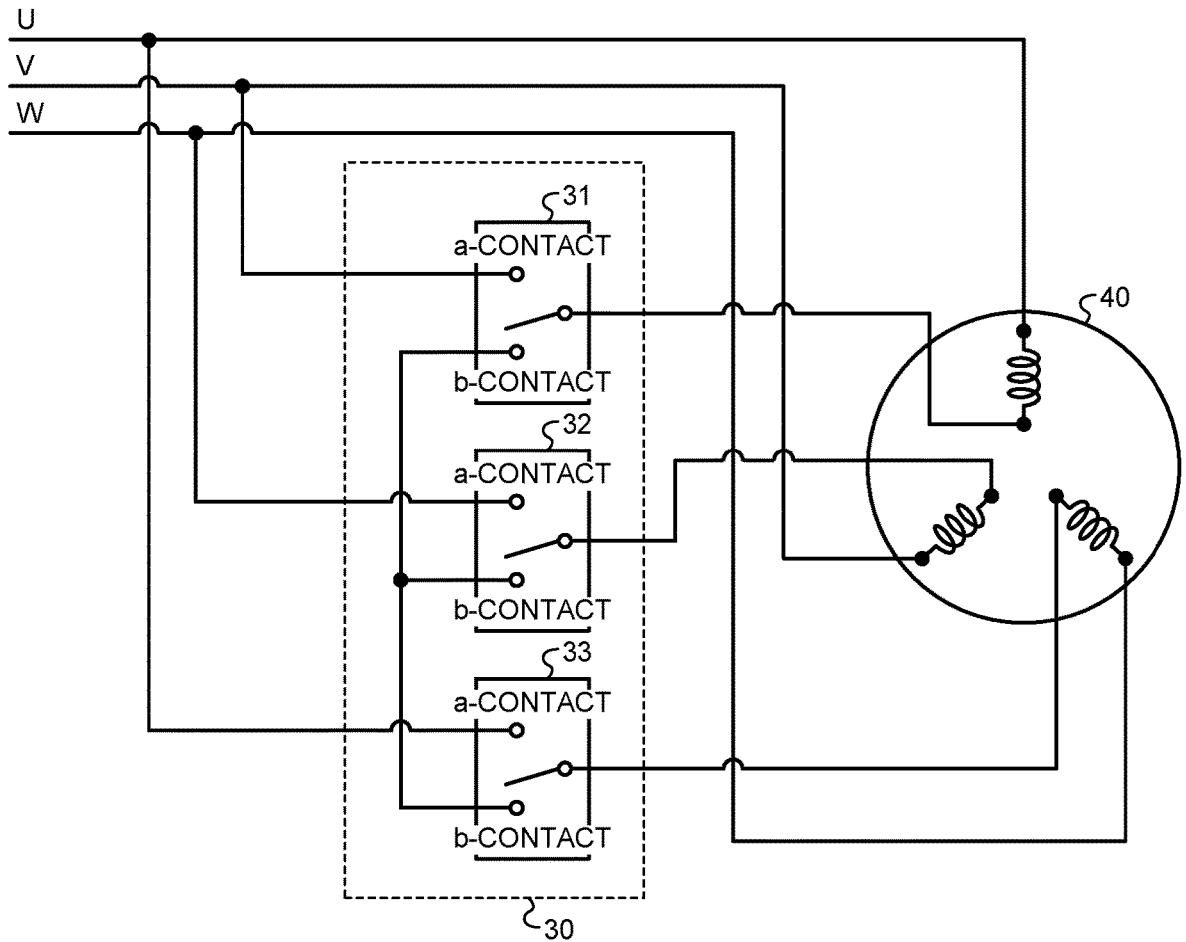
FIG. 2 is a diagram illustrating a configuration of a connection switching unit of the motor drive device according to the first embodiment.

FIG. 2 is a diagram illustrating a configuration of the connection switching unit 30 of the motor drive device 100 according to the first embodiment. The connection switching unit 30 includes three relays 31, 32, and 33. The connection switching unit 30 switches the relays 31, 32, and 33 at the same time in accordance with a connection switching signal obtained from the control unit 50.

The motor 40 is configured to be able to switch the connection state of the stator windings between a star connection and a delta connection. Hereinafter, the star connection is referred to as "Y-connection" and the delta connection is referred to as "Δ-connection". The connection switching unit 30 switches the relays 31, 32, and 33 at the same time to thereby switch the connection state from the Y-connection to the Δ-connection or from the Δ-connection to the Y-connection. When the common contacts of the relays 31, 32, and 33 are connected to "b-contacts (break contacts)", the connection state is the Y-connection. When the common contacts of the relays 31, 32, and 33 are connected to "a-contacts (arbeit contacts)", the connection state is the Δ-connection.

The rotor flux when the connection state is the Y-connection and the rotor flux when the connection state is the Δ-connection have a relation of √3:1. The motor 40 is not limited to one capable of switching the connection state between the Y-connection and the Δ-connection. The motor 40 may be one capable of switching between three or more types of connection states. The motor 40 can take any connection state that can cause a change in the rotor flux as a result of the connection state switching.

The inverter unit 10 illustrated in FIG. 1 includes a plurality of switching elements. The inverter unit 10 converts the direct-current voltage into three-phase alternating currents by causing each of the switching elements to perform on/off operation according to pulse width modulation (PWM) signals obtained from the control unit 50. The switching elements are not illustrated.

The current detection unit 20 detects the current values of two-phase alternating currents of the three-phase alternating currents flowing from the inverter unit 10 to the motor 40. The current detection unit 20 outputs current information that is the result of the detection of the current values of the alternating currents. The current detection unit 20 is not limited to detecting two-phase alternating currents. The current detection unit 20 may detect each of the three-phase alternating currents or may detect direct current obtained by combining the three-phase alternating currents.

The control unit 50 includes a rotor flux estimation unit 51, a connection switching control unit 52, a determination value storage unit 53, a determination processing unit 54, and a drive signal control unit 55. The rotor flux estimation unit 51 obtains the current information from the current detection unit 20 and calculates the estimated rotor flux on the basis of the current information. The rotor flux is the flux through the rotor of the motor 40. The estimated rotor flux is the estimated value of the rotor flux.

The connection switching control unit 52 generates the connection switching signal for controlling switching of the connection state and sends the generated connection switching signal to the connection switching unit 30. The determination value storage unit 53 stores a threshold that is a value used for determination of the connection state.

The determination processing unit 54 obtains the estimated rotor flux from the rotor flux estimation unit 51 and determines the connection state on the basis of the estimated rotor flux. Moreover, the determination processing unit 54 receives the connection switching signal. The determination processing unit 54 reads the threshold from the determination value storage unit 53 and determines the connection state by using the threshold and the connection switching signal. The determination processing unit 54 determines the connection state by comparing the estimated rotor flux with the threshold. Moreover, the determination processing unit 54 identifies the connection state indicated by the connection switching signal. The determination processing unit 54 compares the result of the determination of the connection state with the connection state indicated by the connection switching signal to determine an anomaly of the connection state. The anomaly of the connection state indicates that the actual connection state of the motor 40 is different from the connection state that is recognized by the motor drive device 100 for control of the motor 40.

The drive signal control unit 55 obtains the result of the determination of the connection state from the determination processing unit 54. The drive signal control unit 55 generates PWM signals on the basis of the result of the determination of the connection state.

A value intermediate between the values of the rotor flux in the respective connection states is set as the threshold described above. Specifically, the threshold is a value between the value of the rotor flux when the connection state is the Y-connection and the value of the rotor flux when the connection state is the Δ-connection. The threshold is determined in advance on the basis of the specifications of the motor 40. The threshold determined is stored in the determination value storage unit 53.

In a case when the connection state is determined to be anomalous, the motor drive device 100 can suspend stoppage of the motor 40. The determination processing unit 54 determines whether stoppage of the motor 40 can be suspended. When the number of times stoppage of the motor 40 is suspended has not reached the preset number of times, the determination processing unit 54 determines to suspend stoppage of the motor 40. The determination processing unit 54 counts the number of times stoppage of the motor 40 is suspended. When the number of times stoppage of the motor 40 is suspended has reached the preset number of times, the determination processing unit 54 determines not to suspend stoppage of the motor 40. In such a case, the drive signal control unit 55 stops generation of PWM signals on the basis of the determination made by the determination processing unit 54. The drive signal control unit 55 stops generation of PWM signals, and thus the motor drive device 100 stops the motor 40. The information indicating the number of times preset as a reference for determining whether stoppage of the motor 40 can be suspended is referred to as number-of-suspensions information. The number-of-suspensions information is stored in the determination value storage unit 53.

Figure 3:
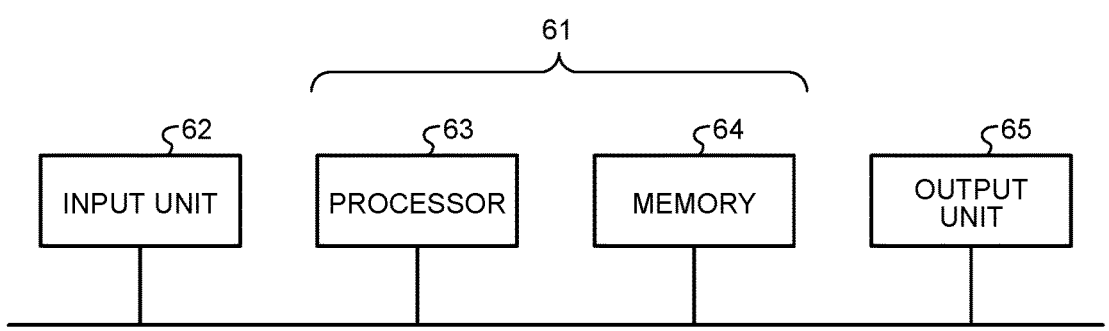
FIG. 3 is a diagram illustrating an exemplary configuration of hardware implementing a control unit of the motor drive device according to the first embodiment.

FIG. 3 is a diagram illustrating an exemplary configuration of hardware implementing the control unit 50 of the motor drive device 100 according to the first embodiment. FIG. 3 illustrates an exemplary configuration in a case where the rotor flux estimation unit 51, the connection switching control unit 52, the determination value storage unit 53, the determination processing unit 54, and the drive signal control unit 55 that are main parts of the control unit 50 are implemented by processing circuitry 61 including a processor 63 and a memory 64.

The processor 63 is a central processing unit (CPU). The processor 63 executes a control program. The control program is a program that describes processing for operating as the rotor flux estimation unit 51, the connection switching control unit 52, the determination value storage unit 53, the determination processing unit 54, and the drive signal control unit 55 that are main parts of the control unit 50.

The memory 64 is, for example, a non-volatile or volatile memory such as a random access memory (RAM), a read only memory (ROM), a flash memory, an erasable programmable ROM (EPROM), or an electrically EPROM (EEPROM (registered trademark)). The memory 64 stores the control program. The memory 64 is also used as a temporary memory in various processing executed by the processor 63. The determination value storage unit 53 is implemented by a non-volatile memory.

An input unit 62 is a circuit that receives an input signal to the control unit 50 from an external device. The input unit 62 receives the current information. An output unit 65 is a circuit that outputs a signal generated by the control unit 50 to a device external to the control unit 50. The output unit 65 outputs PWM signals and the connection switching signal.

The functions of the processing circuitry 61 may be implemented by processing circuitry that is dedicated hardware. The processing circuitry that is dedicated hardware is, for example, an application specific integrated circuit (ASIC), a field programmable gate array (FPGA), or a circuit obtained by combining them. Some of the main parts of the control unit 50 may be implemented by the processor 63 and the memory 64 and the rest may be implemented by dedicated hardware.

A description will be next given of calculation of the estimated rotor flux according to the first embodiment. The estimated rotor flux is obtained in the process of estimating the rotation speed and the rotation position of the motor 40 by an adaptive flux observer method. The rotor flux estimation unit 51 calculates the estimated rotor flux obtained in the process of estimating the rotation speed and the rotation position of the motor 40. The rotor flux estimation unit 51 converts the values of the three-phase alternating currents indicated in the current information into the current values on the d-q axes that are a rotating coordinate system.

It is known that with the adaptive flux observer method, the estimated flux vector and the estimated current vector can be calculated from state equations on the basis of the voltage vector applied to the motor 40, the current vector output from the motor 40, and the estimated angular velocity.

Formulas (1) and (2) shown below are the state equations of the motor 40.

Formula 1

$$\frac{d}{dt}\begin{bmatrix}\hat{\phi}_{ds}\\ \hat{\phi}_{qs}\\ \hat{\phi}_{dr}\end{bmatrix} = \begin{bmatrix}-\frac{R}{L_d} & \omega & 0\\ -\omega & -\frac{R}{L_q} & -\hat{\omega}_r\\ 0 & 0 & 0\end{bmatrix}\begin{bmatrix}\hat{\phi}_{ds}\\ \hat{\phi}_{qs}\\ \hat{\phi}_{dr}\end{bmatrix} + \begin{bmatrix}v_{ds}\\ v_{qs}\\ 0\end{bmatrix} - \begin{bmatrix}h_{11} & h_{12}\\ h_{21} & h_{22}\\ h_{31} & h_{32}\end{bmatrix}\begin{bmatrix}\hat{i}_{ds}-i_{ds}\\ \hat{i}_{qs}-i_{qs}\end{bmatrix} \quad (1)$$

Formula 2

$$\begin{bmatrix}\hat{i}_{ds}\\ \hat{i}_{qs}\end{bmatrix} = \begin{bmatrix}\frac{1}{L_d} & 0 & 0\\ 0 & \frac{1}{L_q} & 0\end{bmatrix}\begin{bmatrix}\hat{\phi}_{ds}\\ \hat{\phi}_{qs}\\ \hat{\phi}_{dr}\end{bmatrix} \quad (2)$$

Here, $L_d$ represents a d-axis inductance and $L_q$ represents a q-axis inductance. Moreover, R represents a motor resistance, $\omega$ represents a primary angular frequency, $\omega_r$ represents an angular velocity, $v_{ds}$ represents a d-axis voltage, $v_{qs}$ represents a q-axis voltage, $i_{ds}$ represents a d-axis current, $i_{qs}$ represents a q-axis current, $\phi_{ds}$ represents a d-axis stator flux, $\phi_{qs}$ represents a q-axis stator flux, and $\phi_{dr}$ represents a d-axis rotor flux. Moreover, $h_{11}$, $h_{12}$, $h_{21}$, $h_{22}$, $h_{31}$, and $h_{32}$ represent observer gains. The observer gains used are any constants that are set in accordance with the motor 40. The symbol "^" denotes an estimated value. Regarding the rotor flux, only the rotor flux in the d-axis direction exists and the rotor flux in the q-axis direction is zero. Thus, $\phi_{qr}$ representing a q-axis rotor flux does not appear in Formulas (1) and (2).

The values of the output voltage commands are used for the d-axis voltage $v_{ds}$ and the q-axis voltage $v_{qs}$ in Formula (1). The d-axis current $i_{ds}$ and the q-axis current $i_{qs}$ are calculated on the basis of the current information. Previous values in the control periods are used for an estimated d-axis stator flux $\hat{\phi}_{ds}$, an estimated q-axis stator flux $\hat{\phi}_{qs}$, an estimated d-axis current $i_{ds}$, an estimated q-axis current $\hat{i}_{qs}$, the primary angular frequency $\omega$, and an estimated angular velocity $\hat{\omega}_r$. An integral value of the estimated d-axis stator flux $\hat{\phi}_{ds}$ and an integral value of the estimated q-axis stator flux $\hat{\phi}_{qs}$ are used for the estimated d-axis current $\hat{i}_{ds}$ and the estimated q-axis current $\hat{i}_{qs}$, respectively.

When the connection state of the motor 40 is switched, the flux of the motor 40 changes. In such a case, the flux is in the d-axis direction, i.e. polarity direction of a magnet. The motor drive device 100 estimates the d-axis rotor flux and uses the result of the estimation to detect switching of the connection state. Based on the relation of Formula (1), the estimated d-axis rotor flux $\hat{\phi}_{dr}$ can be calculated by Formula (3) below.

Formula 3

$$\frac{d}{dt}\hat{\phi}_{dr} = h_{31}(\hat{i}_{ds}-i_{ds}) - h_{32}(\hat{i}_{qs}-i_{qs}) \quad (3)$$

The result of the calculation by Formula (3) is the previous value in the control periods. A value $(d/dt)\hat{\phi}d_r$ that takes into account the control periods is obtained and the result obtained is added to the previous value that is the integral value of Formula (3), whereby the estimated d-axis rotor flux $\hat{\phi}_{dr}$ is obtained.

The determination processing unit 54 uses the property that the rotor flux changes in accordance with the connection state, and determines the connection state from the result of the calculation of the estimated rotor flux. The determination processing unit 54 uses the connection switching signal obtained from the connection switching control unit 52 and the threshold read from the determination value storage unit 53 for determination of the connection state. The determination processing unit 54 recognizes the currently commanded connection state on the basis of the connection switching signal. The determination processing unit 54 determines an anomaly of the connection state by comparing the result of the determination based on the estimated rotor flux with the currently commanded connection state.

FIG. 4 is a flowchart illustrating the operation procedures performed by the motor drive device 100 according to the first embodiment. In step S1, the motor drive device 100 calculates the estimated rotor flux by the rotor flux estimation unit 51. The rotor flux estimation unit 51 calculates the estimated rotor flux in the process of estimating the rotation speed and the rotation position of the motor 40 by the adaptive flux observer method.

In step S2, the motor drive device 100 determines, by the determination processing unit 54, whether the connection switching signal is a signal indicating the Y-connection or a signal indicating the Δ-connection. Specifically, the determination processing unit 54 determines whether the currently commanded connection state is the Y-connection or the Δ-connection.

When it is determined in step S2 that the connection switching signal is a signal indicating the Y-connection, the determination processing unit 54 determines whether the estimated rotor flux is larger than the threshold in step S3. As described above, the threshold is a value between the value of the rotor flux when the connection state is the Y-connection and the value of the rotor flux when the connection state is the Δ-connection. The determination processing unit 54 determines whether the current connection state is the Y-connection by comparing the estimated rotor flux with the threshold.

When the determination processing unit 54 determines that the estimated rotor flux is larger than the threshold (Yes in step S3), the determination processing unit 54 determines that the current connection state is the Y-connection. Moreover, since both the currently commanded connection state and the current connection state are the Y-connection, that is, the currently commanded connection state matches the current connection state, the determination processing unit 54 determines that the connection is normal. In such a case, in step S6, the motor drive device 100 continues driving of the motor 40.

In contrast, when the determination processing unit 54 determines that the estimated rotor flux is smaller than or equal to the threshold (No in step S3), the determination processing unit 54 determines that the current connection state is the Δ-connection. While the currently commanded connection state is the Y-connection, the current connection state is the Δ-connection; therefore, the currently commanded connection state does not match the current connection state. Thus, the determination processing unit 54 determines that the connection state is anomalous. In such a case, the motor drive device 100 advances the procedure to step S5.

When it is determined in step S2 that the connection switching signal is a signal indicating the Δ-connection, the determination processing unit 54 determines whether the estimated rotor flux is smaller than or equal to the threshold in step S4. The determination processing unit 54 determines whether the current connection state is the Δ-connection by comparing the estimated rotor flux with the threshold.

When the determination processing unit 54 determines that the estimated rotor flux is smaller than or equal to the threshold (Yes in step S4), the determination processing unit 54 determines that the current connection state is the Δ-connection. Moreover, since both the currently commanded connection state and the current connection state are the Δ-connection, that is, the currently commanded connection state matches the current connection state, the determination processing unit 54 determines that the connection is normal. In such a case, in step S6, the motor drive device 100 continues driving of the motor 40.

In contrast, when the determination processing unit 54 determines that the estimated rotor flux is larger than the threshold (No in step S4), the determination processing unit 54 determines that the current connection state is the Y-connection. While the currently commanded connection state is the Δ-connection, the current connection state is the Y-connection; therefore, the currently commanded connection state does not match the current connection state. Thus, the determination processing unit 54 determines that the connection state is anomalous. In such a case, the motor drive device 100 advances the procedure to step S5.

In step S5, the motor drive device 100 determines whether the number of times stoppage of the motor 40 is suspended has reached the preset number of times. When the determination processing unit 54 determines that the connection state is anomalous in step S3 or step S4, the determination processing unit 54 increments the current count value of the suspensions. The determination processing unit 54 reads the number-of-suspensions information from the determination value storage unit 53 and compares the count value of the suspensions with the number-of-suspensions information. Through this comparison, the determination processing unit 54 determines whether the number of times stoppage of the motor 40 is suspended has reached the preset number of times.

When it is determined that the number of times stoppage of the motor 40 is suspended is less than the preset number of times (No in step S5), the motor drive device 100 suspends stoppage of the motor 40 in response to the determination that the connection state is anomalous. The motor drive device 100 returns the procedure to step S1.

In contrast, when it is determined that the number of times stoppage of the motor 40 is suspended has reached the preset number of times (Yes in step S5), the motor drive device 100 confirms the determination that the connection state is anomalous. Thus, the motor drive device 100 stops the motor 40 in step S7. In both step S6 and step S7, the determination processing unit 54 clears the count value of the suspensions. Then, the motor drive device 100 ends the operation according to the procedure illustrated in FIG. 4. Stoppage of the motor 40 is allowed to be suspended, and, when anomaly determination is confirmed, the motor 40 is stopped; therefore, the motor drive device 100 can prevent the motor 40 from being stopped because of the false determination.

According to the first embodiment, the motor drive device 100 calculates the estimated rotor flux and determines the connection state of the motor 40 on the basis of the estimated rotor flux; therefore, the motor drive device 100 can check the connection state while the motor 40 is in operation. Since the motor drive device 100 can check the connection state while the motor 40 is in operation, the motor drive device 100 can determine an anomaly of the connection state while the motor 40 is in operation. Therefore, the motor drive device 100 can prevent the situation where the motor 40 continues driving in a state where the actual connection state is different from the connection state recognized in the control of the motor 40.

Since the motor drive device 100 can prevent driving of the motor 40 when the connection state is anomalous, the motor drive device 100 can prevent a reduction in performance of the motor 40 from its original performance. The motor drive device 100 can stably drive the motor 40. The motor drive device 100 can detect an anomaly of the connection state at an early stage through anomaly determination during operation of the motor 40. The motor drive device 100 can maintain the normal connection and thus can obtain a high reliability.

A case is considered where an overcurrent interruption circuit for preventing demagnetization of the motor 40 is provided. In such a case, if switching of the overcurrent interruption circuit is normal but the connection state is anomalous, demagnetization may occur when the current flowing in the motor 40 increases. The motor drive device 100 stops the motor 40 when the connection state is anomalous, and thus can protect the motor 40. This allows for extending the life of the motor 40 and improving the reliability of the motor 40.

The motor drive device 100 utilizes the process of estimating the rotation speed and the rotation position of the motor 40 by the adaptive flux observer method to calculate the estimated rotor flux. The motor drive device 100 can check the connection state with a simple process. Thus, the motor drive device 100 can reduce the processing load during operation of the motor 40. Moreover, the motor drive device 100 can reduce the situations where the processing cannot keep up with the control periods. Therefore, the motor drive device 100 can stably control the motor 40 and achieve a high reliability.

The motor drive device 100 uses the rotor flux for determination of the connection state. The motor drive device 100 can determine the connection state with a simple comparison without using a parameter such as a rotation speed or a load of the motor 40. The motor drive device 100 can reduce parameters used for determination of the connection state. Moreover, the motor drive device 100 can simplify the conditions used for determination of the connection state. Therefore, the motor drive device 100 can reduce the processing load and thus can stably control the motor 40.

The configurations described in the embodiments above are merely examples of the content of the present disclosure. The configurations described in the embodiments can be combined with another known technology. Part of the configurations in the embodiments can be omitted or modified without departing from the gist of the present disclosure.

The invention claimed is:

1. A motor drive device comprising:
   an inverter to supply alternating current to a motor including a plurality of stator windings;
   connection switching circuitry to switch a connection state of the stator windings, the connection switching circuitry being disposed between the inverter and the motor;
   rotor flux estimation circuitry to calculate an estimated rotor flux on a basis of current information, the estimated rotor flux being an estimated value of a rotor flux of the motor, the current information being a result of detection of a current value of the alternating current; and
   determination processing circuitry to determine the connection state on a basis of the estimated rotor flux.

2. The motor drive device according to claim 1, wherein the rotor flux estimation circuitry calculates the estimated rotor flux obtained in a process of estimating a rotation speed and a rotation position of the motor.

3. The motor drive device according to claim 2, further comprising a determination value memory to store a threshold that is a value used for determination of the connection state, wherein
   the determination processing circuitry determines the connection state by comparing the estimated rotor flux with the threshold.

4. The motor drive device according to claim 2, further comprising connection switching control circuitry to generate a connection switching signal to control switching of the connection state, wherein
   the determination processing circuitry determines an anomaly of the connection state on a basis of the connection switching signal and a result of determination of the connection state.

5. The motor drive device according to claim 3, further comprising connection switching control circuitry to generate a connection switching signal to control switching of the connection state, wherein
   the determination processing circuitry determines an anomaly of the connection state on a basis of the connection switching signal and a result of determination of the connection state.

6. The motor drive device according to claim 1, further comprising a determination value memory to store a threshold that is a value used for determination of the connection state, wherein
   the determination processing circuitry determines the connection state by comparing the estimated rotor flux with the threshold.

7. The motor drive device according to claim 6, further comprising connection switching control circuitry to generate a connection switching signal to control switching of the connection state, wherein
   the determination processing circuitry determines an anomaly of the connection state on a basis of the connection switching signal and a result of determination of the connection state.

8. The motor drive device according to claim 1, further comprising a connection switching control circuitry to generate a connection switching signal to control switching of the connection state, wherein
   the determination processing circuitry determines an anomaly of the connection state on a basis of the connection switching signal and a result of determination of the connection state.

* * * * *